(12) United States Patent
Chretien et al.

(10) Patent No.: US 9,735,715 B2
(45) Date of Patent: Aug. 15, 2017

(54) METHODS AND SYSTEMS FOR INDUCTIVE ENERGY MANAGEMENT

(71) Applicant: Regal Beloit America, Inc., Beloit, WI (US)

(72) Inventors: Ludovic Andre Chretien, Columbia City, IN (US); Roger C. Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 273 days.

(21) Appl. No.: 13/842,403

(22) Filed: Mar. 15, 2013

(65) Prior Publication Data

US 2014/0265987 A1    Sep. 18, 2014

(51) Int. Cl.
| | | |
|---|---|---|
| *H02P 3/22* | (2006.01) | |
| *B60L 3/00* | (2006.01) | |
| *H02H 1/00* | (2006.01) | |

(52) U.S. Cl.
CPC ..................... *H02P 3/22* (2013.01)

(58) Field of Classification Search
CPC ................................ H02M 3/33592
USPC ................. 318/701, 807, 258, 494; 361/117
See application file for complete search history.

(56) References Cited

U.S. PATENT DOCUMENTS

| | | | |
|---|---|---|---|
| 3,458,790 A * | 7/1969 | Wilkerson ..................... 318/258 |
| 3,675,099 A * | 7/1972 | Johnston ................. H02P 23/08 |
| | | | 318/378 |
| 4,761,600 A | 8/1988 | D'Atre et al. | |
| 5,086,265 A * | 2/1992 | Uhiendorf ............... H02P 25/04 |
| | | | 318/757 |
| 5,548,196 A * | 8/1996 | Lim ............................. 318/701 |
| 5,583,412 A * | 12/1996 | Nielsen ................... H02P 23/20 |
| | | | 318/368 |
| 5,818,194 A | 10/1998 | Nordby | |
| 6,075,331 A * | 6/2000 | Ando ...................... H02J 7/345 |
| | | | 307/48 |
| 6,215,261 B1 | 4/2001 | Becerra | |
| 6,288,508 B1 * | 9/2001 | Taketomi et al. ............. 318/376 |
| 6,304,066 B1 * | 10/2001 | Wilcox et al. ................ 323/282 |
| 6,577,483 B1 * | 6/2003 | Steicher .................... H02P 3/18 |
| | | | 318/370 |

(Continued)

FOREIGN PATENT DOCUMENTS

| | | |
|---|---|---|
| EP | 1429450 B1 | 2/2008 |
| EP | 1843463 B1 | 7/2013 |

(Continued)

*Primary Examiner* — Eduardo Colon Santana
*Assistant Examiner* — Devon Joseph
(74) *Attorney, Agent, or Firm* — Armstrong Teasdale LLP (57) ABSTRACT

A controller configured to be coupled to an electric motor. The controller including a processor programmed to receive a signal indicating a stopping command of the electric motor, and control a current such that a capacitor coupled to the electric motor is not overcharged by regenerative energy when a stopping of the electric motor has commenced, wherein controlling the current includes one of the following: upon receiving the signal indicating the stopping command of the electric motor, ramping the current down below a threshold level, or upon receiving the signal indicating the stopping command of the electric motor, forcing the current to circulate in motor windings to prevent regeneration of energy in the capacitor.

15 Claims, 7 Drawing Sheets

(56) References Cited

U.S. PATENT DOCUMENTS

| | | | |
|---|---|---|---|
| 6,768,284 B2* | 7/2004 | Lee | H02P 21/36 |
| | | | 318/808 |
| 6,828,746 B2 | 12/2004 | Kumar | |
| 7,002,317 B2* | 2/2006 | Ganev | 318/701 |
| 7,271,566 B2* | 9/2007 | Nguyen Phuoc | H02P 3/18 |
| | | | 318/609 |
| 7,670,253 B2 | 3/2010 | Sah | |
| 7,739,016 B2 | 6/2010 | Morris | |
| 7,865,287 B2* | 1/2011 | Huseman | B60K 6/445 |
| | | | 180/165 |
| 7,908,064 B2 | 3/2011 | Cawthorne et al. | |
| 7,977,896 B2 | 7/2011 | Heap et al. | |
| 7,987,934 B2 | 8/2011 | Huseman | |
| 7,990,092 B2 | 8/2011 | Woodward | |
| 8,010,263 B2 | 8/2011 | Morris | |
| 8,049,459 B2 | 11/2011 | Woodward | |
| 8,050,821 B2 | 11/2011 | Morris et al. | |
| 8,120,295 B2* | 2/2012 | Soma | B60L 7/14 |
| | | | 318/139 |
| 8,140,230 B2 | 3/2012 | Haggerty et al. | |
| 8,195,352 B2 | 6/2012 | Morris | |
| 8,531,811 B2* | 9/2013 | Ruess et al. | 361/117 |
| 2003/0202298 A1* | 10/2003 | Tamaki | B60L 3/0023 |
| | | | 361/23 |
| 2004/0124807 A1* | 7/2004 | Nakata et al. | 318/801 |
| 2004/0136133 A1* | 7/2004 | Youm | 361/91.1 |
| 2004/0227480 A1* | 11/2004 | Kato | H02P 3/14 |
| | | | 318/376 |
| 2004/0246641 A1* | 12/2004 | Sugimoto et al. | 361/91.1 |
| 2005/0179418 A1* | 8/2005 | Ganev | 318/701 |
| 2006/0181240 A1* | 8/2006 | Nguyen Phuoc | 318/807 |
| 2006/0244409 A1* | 11/2006 | Takeuchi | H02K 21/24 |
| | | | 318/811 |
| 2007/0103033 A1* | 5/2007 | Martin | 310/317 |
| 2009/0021199 A1* | 1/2009 | Maeto | H02P 23/0004 |
| | | | 318/400.09 |
| 2011/0222192 A1* | 9/2011 | Fukuda | H02M 5/293 |
| | | | 361/18 |
| 2012/0019178 A1* | 1/2012 | Kono | B60L 3/04 |
| | | | 318/400.3 |
| 2012/0227616 A1* | 9/2012 | Kusano | B60L 7/10 |
| | | | 105/61 |
| 2014/0369813 A1* | 12/2014 | Muramatsu | F04D 27/008 |
| | | | 415/118 |

FOREIGN PATENT DOCUMENTS

| | | |
|---|---|---|
| JP | 4416486 B2 | 2/2012 |
| KR | 101006589 B1 | 1/2011 |

* cited by examiner

METHODS AND SYSTEMS FOR INDUCTIVE ENERGY MANAGEMENT

BACKGROUND OF THE DISCLOSURE

The field of the invention relates generally to electric motors, and more specifically, to methods and systems for inductive energy management.

Typical electric motor systems include a motor controller and an electric motor. The motor controller receives power from an alternating current (AC) power supply, and applies it to a rectifier and to filter capacitors to generate a smoothed direct current (DC) voltage. The motor controller then supplies the DC voltage to the electric motor through an inverter, which uses the power to drive a load.

Filter capacitors typically used in motor controllers include electrolytic capacitors with high capacitances (about 1000 μF). The high capacitances cause the capacitors of the motor controller to be bulky and expensive. These filter capacitors necessitate a larger motor controller and may reduce the lifespan of the motor controller.

BRIEF DESCRIPTION OF THE DISCLOSURE

In one aspect, a controller configured to be coupled to an electric motor is provided. The controller includes a processor programmed to receive a signal indicating a stopping command of the electric motor, and control a current such that a capacitor coupled to the electric motor is not overcharged by regenerative energy when a stopping of the electric motor has commenced. Controlling the current includes one of the following: upon receiving the signal indicating the stopping command of the electric motor, ramping the current down below a threshold level, or upon receiving the signal indicating the stopping command of the electric motor, forcing the current to circulate in motor windings to prevent regeneration of energy in the capacitor.

In another aspect, a system including an electric motor, a capacitor coupled to the electric motor through an inverter, and a controller coupled to the electric motor and the capacitor is provided. The controller includes a processor programmed to receive a signal indicating a stopping command of the electric motor, and control a current such that the capacitor is not overcharged by regenerative energy when the stopping of the electric motor has commenced, wherein controlling the current comprises one of the following: upon receiving the signal indicating the stopping command of the electric motor, ramping the current down below a threshold level, or upon receiving the signal indicating the stopping command of the electric motor, forcing the current to circulate in motor windings to prevent regeneration of energy in the capacitor.

In yet another aspect, a method for controlling a current such that a capacitor coupled to an electric motor is not overcharged by regenerative energy when a stopping of the electric motor has commenced is provided. The method includes receiving a request to stop the electric motor, and upon receiving the request, executing one of the following: ramping the current down below a threshold level, or forcing the current to circulate in motor windings to prevent regeneration of energy in the capacitor.

DETAILED DESCRIPTION OF THE DISCLOSURE

Figure 1:
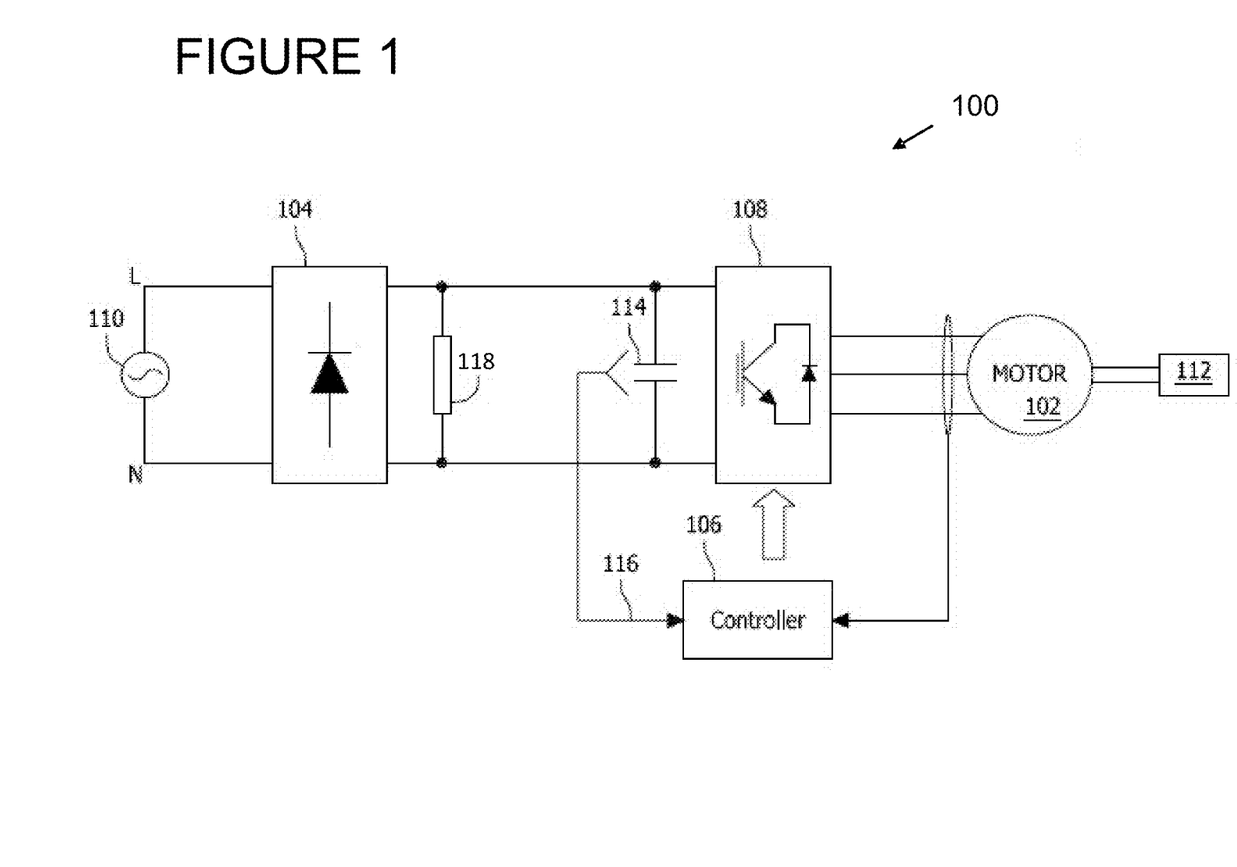
FIG. 1 is a functional diagram of a motor controller that may be used for operating an electric motor.

FIG. 1 is a functional diagram of a motor controller 100 that may be used for operating an electric motor 102. In the exemplary embodiment, motor controller 100 includes a rectifier 104, a controller 106, and an inverter 108. Motor controller 100 is coupled to a power supply 110 for receiving input power to drive electric motor 102. Electric motor 102 is coupled to and drives a load 112.

In one embodiment, power supply 110 supplies a single-phase alternating current (AC) voltage to motor controller 100. However, power supply 110 may supply three-phase AC, direct current (DC) voltage, or any other type of input voltage that enables motor controller 100 to function as described herein. Rectifier 104 receives an AC input voltage from a power supply 110 and rectifies it to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor controller to function as described herein.

In some embodiments, motor controller 100 includes a low-capacitance capacitor 114 for storing small amounts of energy when input voltage is available. Capacitor 114 may have a capacitance below 10 μF/kW, for example, between about 0.1 μF/kW and about 10 μF/kW. As such, the use of bulky, unreliable electrolytic filter capacitors in motor controller 100 is avoided. In some embodiments, capacitor 114 is configured to filter out switching frequency harmonics of electric motor 102. In other embodiments, the low-capacitance of capacitor 114 reduces inrush input current to electric motor 102. Further, capacitor 114 facilitates motor controller 100 increasing line input power factor.

In one embodiment, while input voltage is available, controller 106 enables small amounts of energy to be stored in capacitor 114. When the AC line input voltage approaches zero, controller 106 controls capacitor 114 to provide the stored energy to electric motor 102. The amount of energy stored in capacitor 114 is represented by the equation $$\frac{C*\Delta U^2}{2},$$

where C represents a capacitance of capacitor 114 and ΔU represents a change in voltage in capacitor 114 with respect to time.

Figure 2:
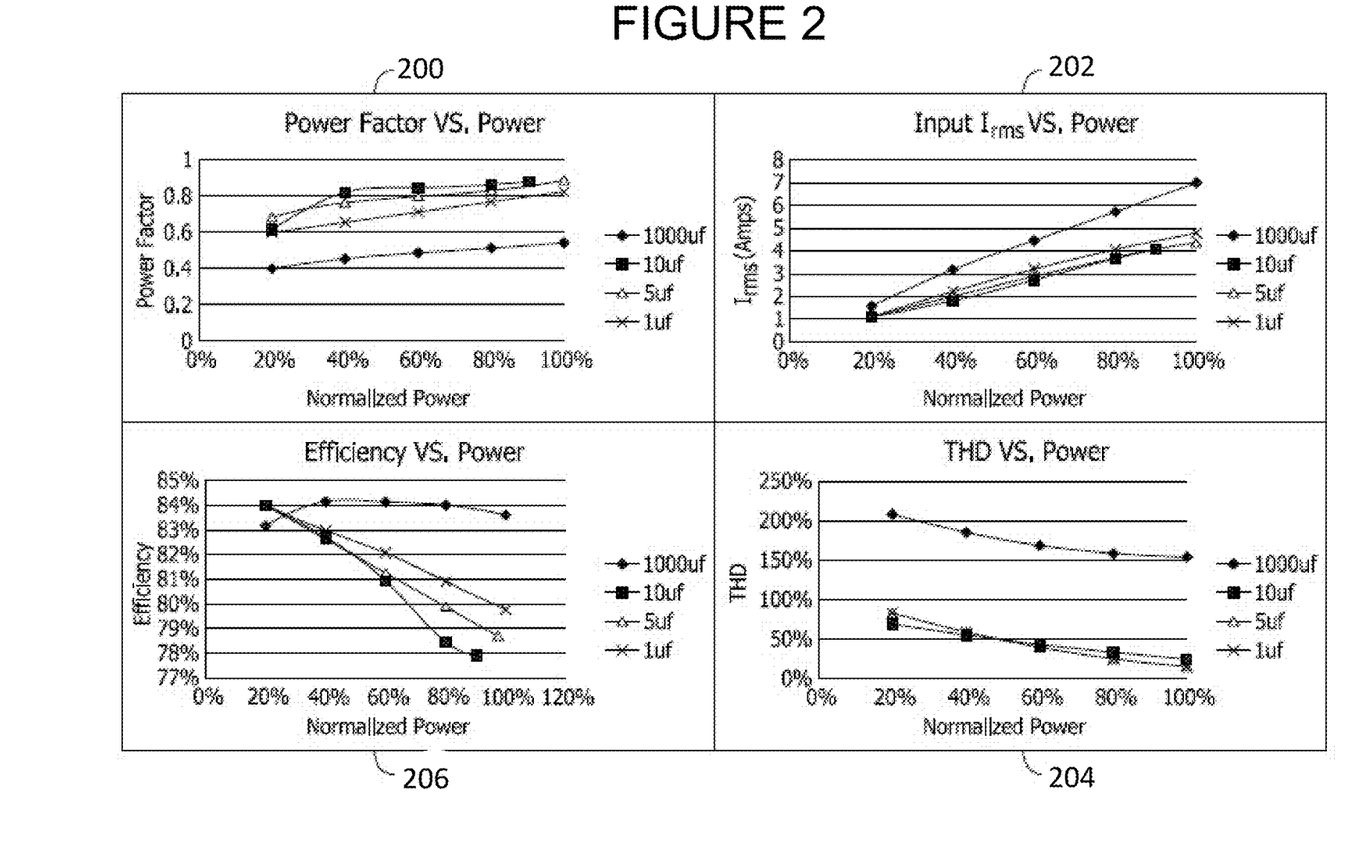
FIG. 2 illustrates multiple performance benefits achieved by using the exemplary motor controller shown in FIG. 1.

FIG. 2 illustrates multiple performance benefits achieved by using motor controller 100 (shown in FIG. 1) as opposed to using known motor controllers (not shown) using large electrolytic capacitors. Performance of a known motor controller using 1000 µF electrolytic filter capacitors is represented by the line containing diamonds. Performance of motor controller 100 using a 10 µF capacitor 114 (shown in FIG. 1) is represented by the line containing squares; using a 5 µF capacitor 114 is represented by the line containing triangles; and using a 1 µF capacitor 114 is represented by the line containing "X's".

Graph 200 compares a power factor of electric motor 102 (shown in FIG. 1) to different power levels of electric motor 102 (shown in FIG. 1). The power factor of electric motor 102 using motor controller 100 (shown in FIG. 1) is noticeably higher than the power factor of an electric motor using known electrolytic capacitor motor controllers, regardless of which capacitance of capacitor 114 (shown in FIG. 1) is used.

Graph 202 compares input current to operating power of electric motor 102 (shown in FIG. 1). Input current is inversely related to the power factor shown in graph 200. Graph 202 shows that electric motor 102 (shown in FIG. 1) with motor controller 100 (shown in FIG. 1) operates at the same power level, while using less input current than known motor controllers.

In one embodiment, with reference back to FIG. 1, motor controller 100 may also include a voltage sensor 116 coupled across capacitor 114. Voltage sensor 116 is configured to measure a DC link voltage being output by rectifier 104. Voltage sensor 116 provides the DC link voltage measurement to controller 106 for use in enabling electric motor 102 to control a current such that capacitor 114 is not overcharged by regenerative energy when electric motor 112 is stopped. For example, in conventional motor drives, when a motor is stopped, a direct current (DC) bus capacitance is large enough to absorb regenerative energy within motor windings without charging the capacitor with potentially damaging voltages. However, if the capacitor has a low maximum capacitance (e.g., about 10 µF/kW), the capacitor is unable to absorb the regenerative energy within the motor windings if the regenerated voltage would exceed the maximum voltage rating of the capacitor. Therefore, to ensure the maximum voltage rating is not exceeded, embodiments of the present disclosure enable motor controller 100 to control a current such that a capacitor with low capacitance (e.g., capacitor 114) is not overcharged by regenerative energy when the electric motor 102 is stopped. As described in more detail with respect to FIGS. 4 and 5, upon receiving a signal indicating the stopping of the electric motor, motor controller 100 can either ramp the current down below a threshold level such that the regenerative energy does not exceed a maximum voltage rating of capacitor 114, or motor controller 100 can force a current to circulate in motor windings to prevent regeneration of energy in capacitor 114.

In one embodiment, motor controller 100 also includes a voltage clamping device 118 coupled across a DC link of motor controller 100. Voltage clamping device 118 is configured to protect motor controller 100 from over-voltage conditions. As such, voltage clamping device 118 may be used to prevent capacitor 114 from receiving a level of regeneration voltage that will damage capacitor 114. In one embodiment, when voltage clamping device 118 is triggered (e.g., regeneration voltage reaches a maximum threshold), voltage clamping device 118 absorbs the energy and limits the high voltage amplitude.

Figure 3:
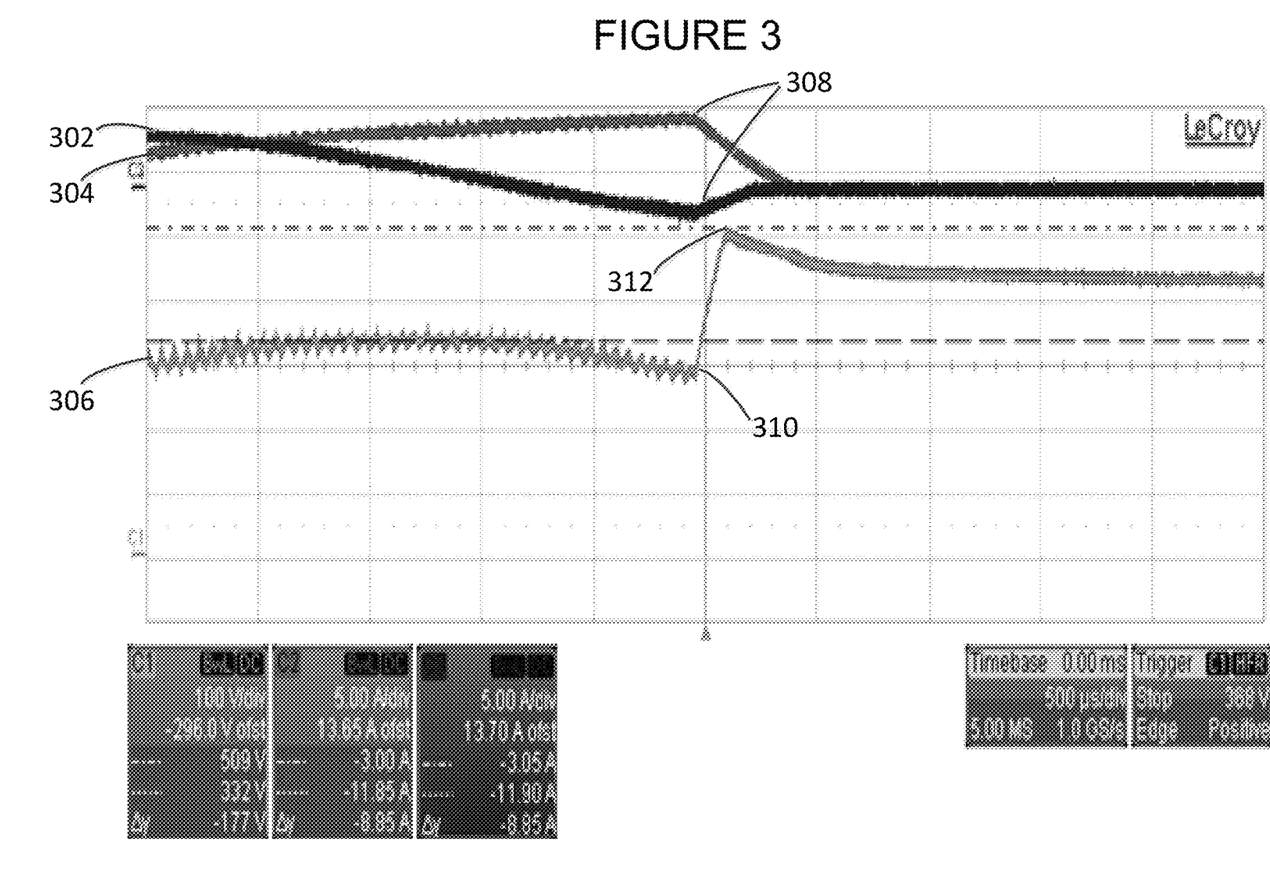
FIG. 3 is a graph that illustrates a voltage clamping device clamping a regenerative voltage.

FIG. 3 provides a graph that illustrates voltage clamping device 118 (shown in FIG. 1) clamping a regenerative voltage. Points 302 and 304 indicate motor currents and point 306 indicates a DC bus capacitor voltage. As shown in FIG. 3, when electric motor 102 (shown in FIG. 1) is commanded to stop, motor currents 302 and 304 decay at 308 and voltage 306 rises sharply at 310 from 330V to 509 volts. However, voltage 306 is limited by voltage clamping device 118 (shown in FIG. 1) at 312. Thus, voltage 306 is clamped before voltage 306 reaches a level that would damage capacitor 114 (shown in FIG. 1) and prior to the motor currents 302 and 304 totally decay.

In one embodiment, and with reference back to FIG. 1, voltage clamping device 118 may be used as a back-up for motor controller 100 in case motor controller 100 cannot ramp the current down below a threshold level such that the regenerated voltage does not exceed a maximum voltage rating of capacitor 114 when electric motor 102 is commanded to stop. Further, voltage clamping device 118 may be used as a back-up for motor controller 100 if motor controller 100 cannot force a current to circulate in motor windings to prevent regeneration of energy in capacitor 114 when electric motor 102 is commanded to stop. In one embodiment, voltage clamping device 118 is a metal oxide varistor (MOV). In alternative embodiments, voltage clamping device 118 may be any device capable of providing over-voltage protection such as transient voltage suppressors (TVS), gas discharge tubes (GDT) or any combination of these.

Figure 4:
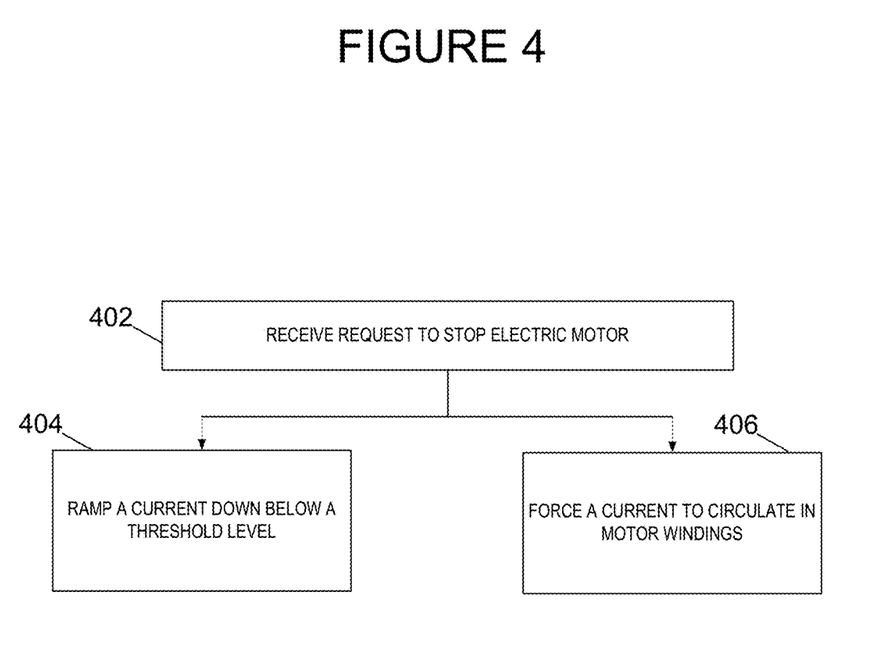
FIGS. 4 and 5 are flow charts of an exemplary process for controlling a current such that a capacitor coupled to an electric motor is not overcharged by regenerative energy.
Figure 5:
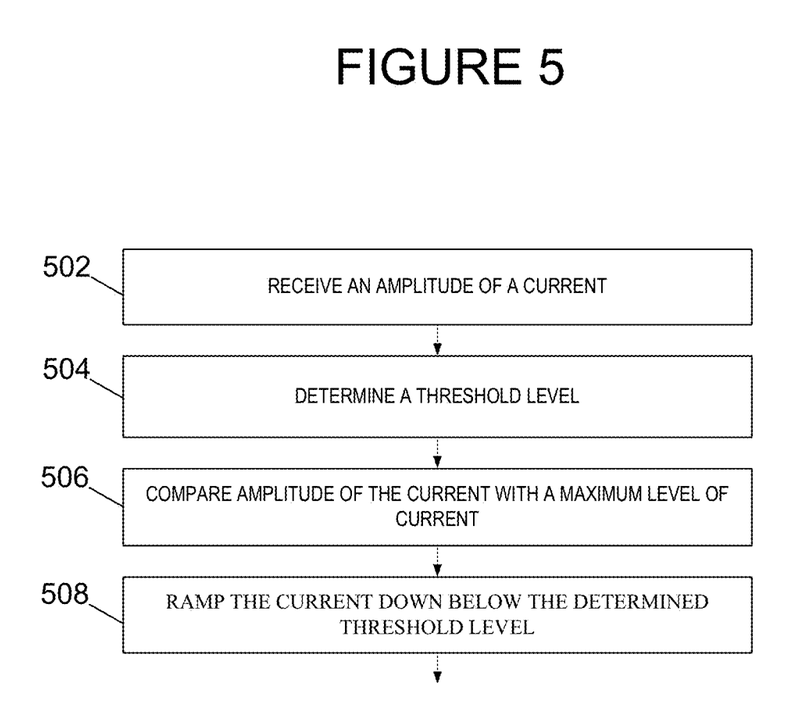

Controller 106 may be implemented in one or more processing devices, such as a microcontroller, a microprocessor, a programmable gate array, a reduced instruction set circuit (RISC), an application specific integrated circuit (ASIC), etc. Accordingly, in this exemplary embodiment, the processes described below with respect to FIGS. 4 and 5 are constructed in software and/or firmware embedded in one or more processors (not shown). In this manner, controller 106 is programmable, such that instructions, intervals, thresholds, and/or ranges, etc. may be programmed for particular components, for example, a particular electric motor 102, a particular capacitor 112, and/or a particular voltage clamping device 118.

FIG. 4 is a block diagram of an exemplary process implemented by controller 106 (shown in FIG. 1). Because there is no filter capacitor in motor controller 100 (shown in FIG. 1), DC link voltage can drop to zero each time the AC input voltage drops to zero. Typically, when DC link voltage drops to zero, also referred to as a 100% voltage ripple, regeneration and braking can occur in electric motor 102, which may cause undesired effects in electric motor 102 (shown in FIG. 1). In the exemplary embodiment, controller 106 is configured to control electric motor 102 (shown in FIG. 1) to control an inductive current when electric motor 102 is requested to stop (e.g., when input voltage is one of approaching zero and equal to zero). More specifically, at 402, a request is received by controller 106 (shown in FIG. 1) to stop electric motor 102 (shown in FIG. 1). At 404, upon receiving the request, controller 106 may ramp a current down below a threshold level or at 406, force the current to circulate in motor windings (not shown) to prevent regeneration of energy in capacitor 114 (shown in FIG. 1).

With reference now to FIG. 5, ramping a current down below a threshold level will now be described. At 502, controller 106 (shown in FIG. 1) receives an amplitude of the current. For example, if electric motor 102 at full load is running at 8 amperes, controller 106 (shown in FIG. 1) determines/receives an amplitude of the current at 8 amperes. At 504, a threshold level is determined such that the determined threshold level is a level the current needs to be below prior to electric motor 102 being stopped in order for the regenerated voltage received by capacitor 114 (shown in FIG. 1) to not exceed a maximum threshold. In one embodiment, the determined threshold level is based on at least one of a fixed threshold in the controller settings, a computed threshold based on at least one of capacitor value, maximum voltage rating of the capacitor, winding characteristics such as resistance and inductance, and motor operating settings such as speed and winding current. At 506, controller 106 compares the amplitude of the current with a maximum level of current before commanding the inverter in an OFF state based on the determined threshold level. At 508, controller 106 ramps the current down below the determined threshold level.

Figure 6:
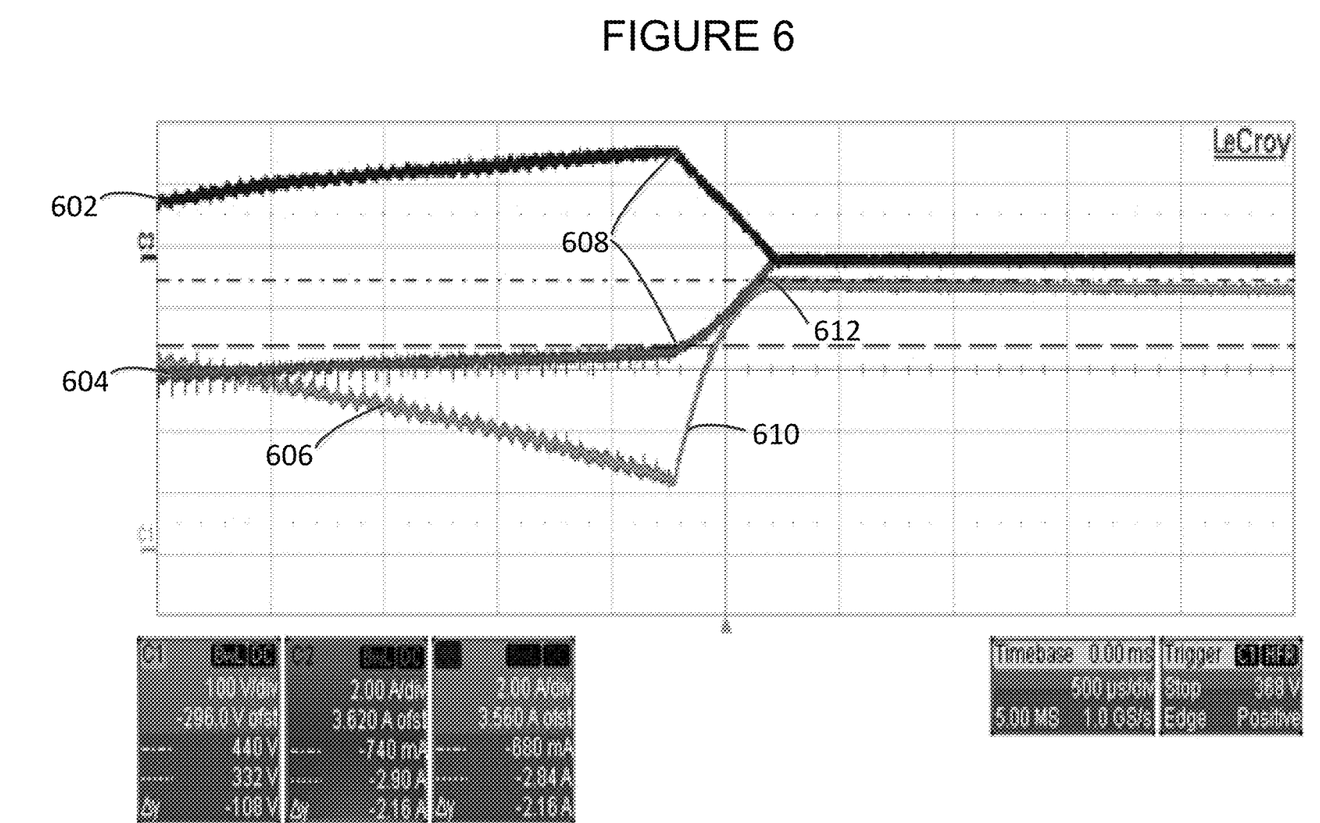
FIG. 6 is a graph that illustrates regeneration after a current has been reduced to below a threshold level.

FIG. 6 provides a graph that illustrates regeneration after a current has been reduced to below a threshold level. Points 602 and 604 indicate motor currents and point 606 indicates a DC bus capacitor voltage. As shown in FIG. 6, when electric motor 102 (shown in FIG. 1) is commanded to stop, motor currents 602 and 604 decay at 608. However, since motor currents 602 and 604 have been reduced prior to electric motor 102 (shown in FIG. 1) stopping, a voltage increase at 610 is reduced to 440 volts at 612. Further, it can be seen that voltage 606 rises until motor currents 602 and 604 decay to 0.

With reference back to FIG. 4, at 406, controller 106 (shown in FIG. 1) may force the current to circulate in motor windings to prevent regeneration of energy in capacitor 114 (shown in FIG. 1). That is, instead of reducing the current to below a threshold level such that a regenerated voltage circulated to capacitor 114 (shown in FIG. 1) does not damage capacitor 114 (shown in FIG. 1), controller 106 (shown in FIG. 1) may instead prevent a regeneration of energy by forcing the current to circulate in motor windings.

Figure 7:
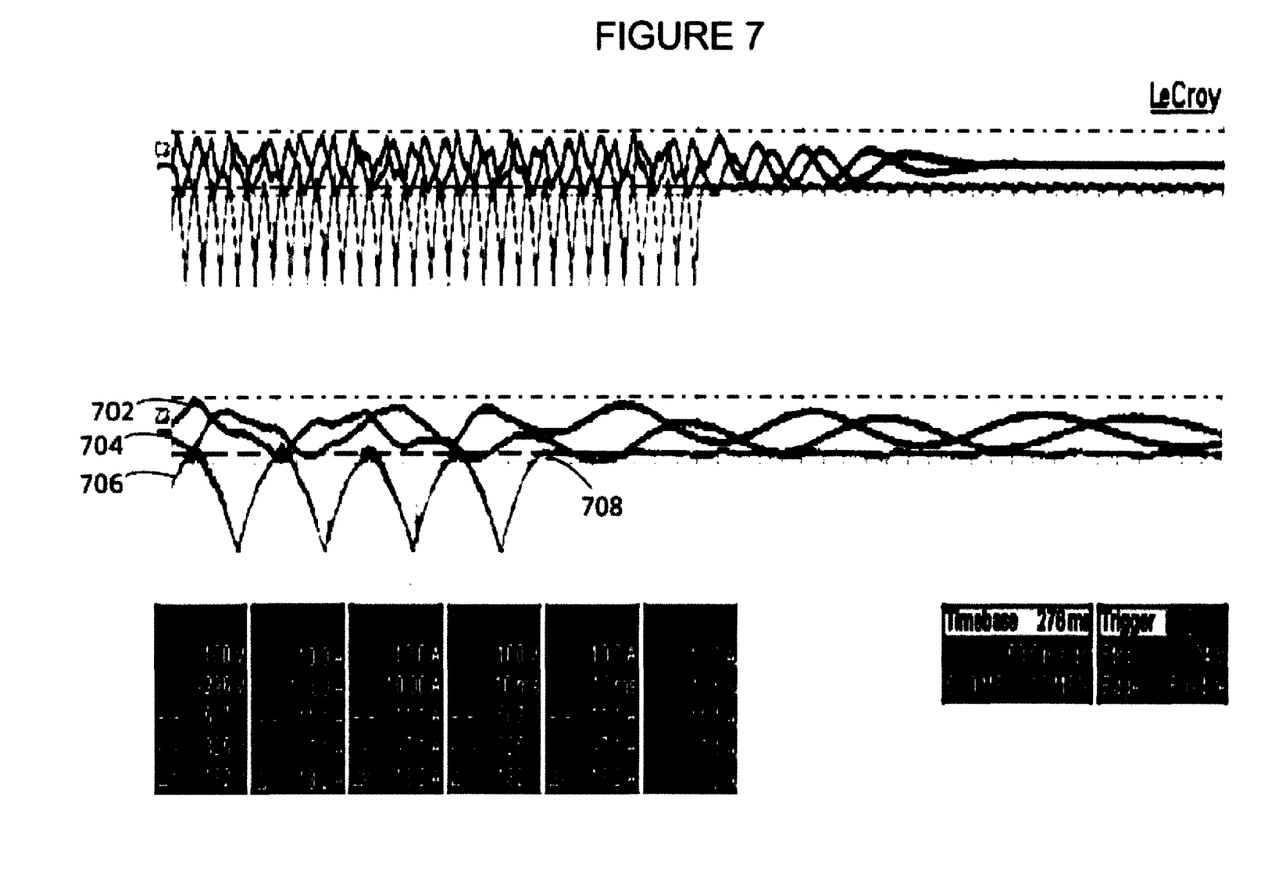
FIG. 7 is a graph that illustrates a current being circulated into motor windings.

FIG. 7 provides a graph that illustrates a current being circulated into motor windings (e.g., winding short circuit) instead of being regenerated. Points 702 and 704 indicate motor currents and point 706 indicates a DC bus capacitor voltage. A rise in the voltage as shown in FIGS. 3 and 6 are a result of the winding current returning to the bus. However, by forcing the current to circulate in the motor windings, it is possible to prevent regeneration of any voltage. In one embodiment, a winding short circuit is performed until electric motor 102 has stopped and current becomes 0 and therefore the current is 0, or controller 106 circulates the current in motor windings until the current decays below a threshold. Thus, as shown in FIG. 7, at 708, there is no spike in voltage 706 because no regeneration is occurring.

The methods, systems, and apparatus are not limited to the specific embodiments described herein, but rather, components of each apparatus, as well as steps of each method, may be utilized independently and separately from other components and steps described herein. Each component, and each method step, can also be used in combination with other components and/or method steps. Furthermore, although described herein with respect to an electric motor, the methods, systems, and apparatus described herein are applicable to all electric machines, including electric motors and electric generators.

Although specific features of various embodiments of the invention may be shown in some drawings and not in others, this is for convenience only. In accordance with the principles of the invention, any feature of a drawing may be referenced and/or claimed in combination with any feature of any other drawing.

When introducing elements/components/etc. of the systems and apparatus described and/or illustrated herein, the articles "a," "an," "the," and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller configured to coupled to an electric motor, the controller comprising:
a rectifier configured to convert an alternating current (AC) input voltage received from a power source to a direct current (DC) link voltage;
a DC link capacitor coupled to an output of the rectifier and having a capacitance below 10 μF, the DC link capacitor configured to receive the DC link voltage, wherein the DC link voltage drops to a value of approximately zero during each cycle when the AC input voltage transits a value of zero;
an inverter coupled to an output of the DC link capacitor and comprising a plurality of switches configured to condition the DC link voltage to output an AC voltage for driving the electric motor; and
a processor coupled to the DC link capacitor and the inverter, said processor programmed to:
receive a measurement of the DC link voltage from a voltage sensor coupled to the DC link capacitor;
issue a stopping command to stop the electric motor by opening the inverter switches each time the DC link voltage drops to the value of approximately zero; and
control current provided to the electric motor to prevent overcharging of the DC link capacitor beyond a maximum voltage rating of the DC link capacitor by regenerative energy when a stopping of the electric motor commences as the DC link voltage drops to the value of approximately zero, wherein controlling the current comprises one of the following:
when the DC link voltage has the value of approximately zero, ramping the current provided to the electric motor down below a threshold level before opening the inverter switches, the threshold level being a level at which an amplitude of the current measured by a current sensor on the electric motor must be below before the electric motor is turned off to prevent regenerated voltage from exceeding the maximum voltage rating of the DC link capacitor; or
causing a short-circuit condition in windings of the electric motor to force the current to circulate in the windings to prevent any regeneration of energy back to the DC link capacitor when the DC link voltage has the value of approximately zero.

2. A controller in accordance with claim 1, wherein ramping the current down below a threshold level comprises:
receiving the amplitude of the current;
determining the threshold level;
comparing the amplitude of the current with a maximum level of current based on the determined threshold level; and ramping the current down below the determined threshold level.

3. A controller in accordance with claim 1, wherein the processor is further programmed to send a signal requesting an inverter to be in an off-state upon receiving the signal indicating the stopping of the electric motor.

4. A controller in accordance with claim 3, wherein the processor is further programmed to, prior to sending the signal to the inverter, ramping the current down below the threshold level.

5. A system comprising:
an electric motor; and
a motor drive circuit comprising:
a rectifier configured to convert an alternating current (AC) input voltage received from a power source to a direct current (DC) link voltage;
a DC link capacitor coupled to an output of the rectifier and having a capacitance below 10 µF, the DC link capacitor configured to receive the DC link voltage, wherein the DC link voltage drops to a value of approximately zero during each cycle when the AC input voltage transits a value of zero;
an inverter coupled to an output of the DC link capacitor and comprising a plurality of switches configured to condition the DC link voltage to output an AC voltage for driving the electric motor; and
a controller coupled to the electric motor, the DC link capacitor, and the inverter, the controller comprising a processor programmed to:
receive a measurement of the DC link voltage from a voltage sensor coupled to the DC link capacitor;
issue a stopping command to stop the electric motor by opening the inverter switches each time the DC link voltage drops to the value of approximately zero; and
control current provided to the electric motor to prevent overcharging of the DC link capacitor beyond a maximum voltage rating of the C link capacitor by regenerative energy when stopping of the electric motor commences as the DC link voltage drops to the value of approximately zero, wherein controlling the current comprises one of the following:
when the DC link voltage has the value of approximately zero, ramping the current provided to the electric motor down below a threshold level before opening the inverter switches, the threshold level being a level at which an amplitude of the current measured by a current sensor on the electric motor must be below before the electric motor is turned off to prevent regenerated voltage from exceeding the maximum voltage rating of the DC link capacitor; or
causing a short-circuit condition in windings of the electric motor to force the current to circulate in the windings to prevent any regeneration of energy in the DC link capacitor when the DC link voltage has the value of approximately zero.

6. A system in accordance with claim 5, wherein ramping the current down below a threshold level comprises:
receiving the amplitude of the current;
determining the threshold level;
comparing the amplitude of the current with a maximum level of current based on the determined threshold level; and
ramping the current down below the determined threshold level.

7. A system in accordance with claim 5, wherein the processor is further programmed to send a signal requesting the inverter to be in an off-state upon receiving the signal indicating the stopping of the electric motor.

8. A system in accordance with claim 7, wherein the processor is further programmed to, prior to sending the signal to the inverter, ramping the current down below the threshold level.

9. A system in accordance with claim 5, further comprising a voltage clamping device coupled the capacitor, the voltage clamping device configured to protect the capacitor from being overcharged by regenerative energy, the voltage clamping device configured to absorb the regenerative energy if the regenerated voltage reaches a maximum threshold.

10. A system in accordance with claim 9, wherein the voltage clamping device is at least one of a metal oxide varistor, a transient voltage suppressor, and a gas discharge tube.

11. A method for controlling a current to prevent overcharging of a direct current (DC) link capacitor coupled to an electric motor by regenerative energy when a stopping of the electric motor has commenced by opening switches of an inverter coupled to the electric motor, wherein the capacitor has a capacitance below 10 µF/kW, the method comprising:
converting, by a rectifier coupled to the DC link capacitor, an alternating current (AC) input voltage received from a power source to a DC link voltage, wherein the DC link voltage drops to a value of approximately zero during each cycle when the AC input voltage transits a value of zero;
receiving, by a controller coupled to the DC link capacitor, the inverter, and the electric motor, a measurement of the DC link voltage from a voltage sensor coupled to the DC link capacitor;
issuing a stopping command to stop the electric motor by opening the inverter switches each time the DC link voltage drops to the value of approximately zero; and
upon issuing the stopping command, controlling current provided to the electric motor to prevent overcharging of the DC link capacitor beyond a maximum voltage rating of the DC link capacitor by regenerative energy when a stopping of the electric motor commences as the DC link voltage drops to the value of approximately zero, wherein controlling the current comprises executing one of the following:
when the DC link voltage has the value of approximately zero, ramping, by the controller, the current provided to the electric motor down below a threshold level before opening the inverter switches, the threshold level being a level at which an amplitude of the current measured by a current sensor on the electric motor must be below before the electric motor is turned off to prevent regenerated voltage from exceeding the maximum voltage rating of the DC link capacitor; or
causing a short-circuit condition in windings of the electric motor to force the current to circulate in the windings to prevent regeneration of any energy back to the DC link capacitor when the DC link voltage has the value of approximately zero.

12. A method in accordance with claim 11, wherein ramping the current down below a threshold level comprises:
receiving the amplitude of the current;
determining the threshold level;
comparing the amplitude of the current with a maximum level of current based on the determined threshold level; and ramping the current down below the determined threshold level.

13. A method in accordance with claim 11, further comprising requesting an inverter to be in an off-state upon receiving the request to stop the electric motor.

14. A method in accordance with claim 13, further comprising, prior to requesting the inverter to be in an off-state, ramping the current down below the threshold level.

15. A method in accordance with claim 11, wherein forcing the current to circulate in motor windings to prevent regeneration of energy in the capacitor is performed until the electric motor has stopped or until the current decays below a threshold.

* * * * *